US006255424B1

(12) United States Patent
Knauss

(10) Patent No.: US 6,255,424 B1
(45) Date of Patent: Jul. 3, 2001

(54) DENDRITIC POLYMERS AND CONVERGENT METHOD OF SYNTHESIS

(75) Inventor: Daniel M. Knauss, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 09/200,162

(22) Filed: Nov. 25, 1998

Related U.S. Application Data
(60) Provisional application No. 60/066,833, filed on Nov. 25, 1997.

(51) Int. Cl.⁷ .................................................. C08F 212/06
(52) U.S. Cl. ...................... 526/347; 526/329; 526/329.2; 526/346
(58) Field of Search ................................ 526/329, 329.2, 526/346, 347

(56) References Cited

U.S. PATENT DOCUMENTS

| | | | |
|---|---|---|---|
| 4,507,466 | 3/1985 | Tomalia et al. | 528/332 |
| 4,694,064 | 9/1987 | Tomalia et al. | 528/332 |
| 4,857,615 | 8/1989 | Bronn et al. | 526/173 |
| 4,857,618 | 8/1989 | Silver et al. | 526/240 |
| 4,871,779 | 10/1989 | Killat et al. | 521/28 |
| 4,906,691 | 3/1990 | Joseph et al. | 525/99 |
| 5,041,516 | 8/1991 | Frechet et al. | 528/44 |
| 5,587,446 | 12/1996 | Frechet et al. | 526/333 |
| 5,663,260 | 9/1997 | Frechet et al. | 526/292.9 |

FOREIGN PATENT DOCUMENTS

| | | |
|---|---|---|
| WO 93/21259 | 10/1993 | (WO) . |
| WO 96/11962 | 4/1996 | (WO) . |

OTHER PUBLICATIONS

Al–Muallen, H.A. and D.M. Knauss, "Development of a Living Polymerization Approach Toward Dendritic Polymers," Polymer Preprints, vol. 38, No. 1, Apr. 1997, American Chemical Society, The Division of Polymer Chemistry, Inc., pp. 68–69.

Frechet, Jean M.J. et al., Self–Condensing Vinyl Polymerization: An Approach to Dendritic Materials, Science, vol. 269, Aug. 25, 1995, pp. 1080–1083.

Gaynor, Scott G. et al., "Synthesis of Branched and Hyperbranched Polystyrenes," Macromolecules, vol. 29, No. 3, 1996, pp. 1079–1081.

Knauss, D.M. and H.A. Al–Muallem, "Functionalized Dendritic Polymers and Copolymers by Convergent Anionic Polymerization," Polymeric Materials Science and Engineering, vol. 77, Proceedings of The American Chemical Society, Division of Polymeric Materials: Science and Engineering, Fall Meeting, Sep. 8–11, 1997, Las Vegas, Nevada, pp. 493–494.

Ma, J.–J. et al., "Branched Block Copolymer Prepared Using Branching Agents with Dual Functionality," American Chemical Society, Polymer Preprints, vol. 35, No. 2, Aug. 1994, Division of Polymer Chemistry, Inc., pp. 572–573.

Newkome, G.R. et al., Dendritic Molecules, VCH Verlagsgesellschaft mbH, D–69451 Weinheim (Federal Republic of Germany), 1996, Chapter 5, "Synthetic Methodologies: Convergent Procedures," pp. 107–163.

*Primary Examiner*—Helen L. Pezzuto
(74) *Attorney, Agent, or Firm*—Holme Roberts & Owen LLP; Christopher J. Kulish, Esq.

(57) ABSTRACT

A convergent process for synthesizing dendritic polymers typically having an average of three or more generations of branching and a narrow polydispersity. Precursor segments with living ends are coupled via a coupling agent to form branched units, each unit having a single living end. Further reaction with the coupling agent results in formation of a dendritic structure. Reaction of the coupling agent is controlled, such as by slow addition to the reaction mixture over an extended time, to promote development of the dendritic structure. The coupling agent typically has at least two functional groups capable of reacting with the living ends in the reaction mixture. One of the groups is capable of reacting with a living end in an addition reaction such as a vinyl addition, ring opening, or group transfer reaction. Optionally, a monomer can be added with the coupling agent to form longer branches. The structures may be terminated with a suitable functional group or with a linear polymer chain. One or more of the dendritic structures may be incorporated into a larger molecule.

48 Claims, 8 Drawing Sheets

DENDRITIC POLYMERS AND CONVERGENT METHOD OF SYNTHESIS

CROSS REFERENCE TO RELATED APPLICATIONS

This application claims priority under 35 U.S.C. §119 to prior U.S. Provisional Patent Application No. 60/066,833, filed Nov. 25, 1997, the entire contents of which are incorporated herein as if set forth herein full.

FIELD OF THE INVENTION

The present invention relates to a convergent method of making dendritic polymer structures and the dendritic polymer structures manufacturable by the method. The present invention is particularly useful for making dendritic polymer structures of vinyl-containing monomers via addition polymerization in a living polymer system.

BACKGROUND OF THE INVENTION

In recent years, certain highly branched polymers have attracted considerable attention because of their special physical and chemical properties. Hyperbranched polymers are polymers having a very high degree of branching and with at least some branches coming off of other branches. A dendrimer is an ideal type of hyperbranched polymer having a perfectly regular network of generational branching of branches from other branches. Dendritic polymers are hyperbranched polymers that possess a high degree of regularity in a branching network, even if not attaining the perfect regularity of true dendrimers.

One useful property of many highly branched polymers, and especially dendritic polymers, is that they tend to exhibit significantly different flow properties than polymers without significant branching. For linear polymers, polymer viscosity is generally a function of the polymer chain length, and thus, also the polymer molecular weight, with viscosity generally increasing with increasing molecular weight. Dendritic polymers, however, tend to have significantly lower viscosities than linear polymers of similar overall composition and molecular weight. Because of the reduced viscosity of dendritic polymers, they have been proposed as viscosity-modifying additives. For example, dendritic polymers may be mixed with other polymers to form compositions with reduced viscosity for advantageous melt processing, such as is encountered during processes for foaming, molding, and extruding polymeric materials. Because the polymer mixture including the dendritic additive has a lower melt viscosity than would be the case in the absence of the dendritic additive, melt processing can be accomplished with lower energy requirements.

As another example of viscosity modification, highly branched star-shaped polymers have been proposed as viscosity modifiers in motor oil. Star-shaped polymers have branching arms (typically four branching arms) that radiate from a central core. At low temperatures the arms are tightly folded about the core and do not have a large effect on the viscosity of the mixture. At higher temperatures, however, the arms unfold to provide a significant viscosity increasing effect for the mixture at the higher temperatures.

Another significant property of highly branched polymers is the large number of sites available for functionalization at the free terminal ends of the numerous exterior branches. This feature of dendritic polymers provides great promise for advantageous functionalization of dendritic polymers for various uses, such as, for example, as ion exchange resins, ligands for chelation or complexation, polyelectrolytes, unimolecular micelles, and solubility modifying agents. For these and other applications, a highly dendritic structure and a large molecular weight would typically be desirable.

Even with these advantageous features, however, dendritic polymers have been slow to gain commercial acceptance. This is largely because methods for synthesizing highly dendritic polymers tend to be very cumbersome and expensive. Also, the dendritic polymers that are produced often do not have a sufficiently high molecular weight or a sufficiently large number of generations of branching, or both, for advantageous use in many applications. Furthermore, only a limited number of different polymer compositions have been manufactured in a highly dendritic form.

Two basic approaches have been used to synthesize highly branched polymers. One approach is divergent. Divergent synthesis involves building the molecule in an outward fashion beginning at a central core, or apex. The structure grows by adding branches, one generation at a time, to the exterior portions of the growing structure. Some divergent syntheses have been reported to yield highly dendritic structures, having narrow polydispersities, or variations in size and structure. One problem with divergent synthesis, however, is that the technique is complex, and generally requires intermediate isolation and purification between generations. Divergent synthesis is, therefore, practically limited to manufacture of dendritic structures containing only a small number of generations of branching. Furthermore, product yields are often low because of the numerous isolation and purification steps that may be required.

A second approach to synthesizing highly branched polymers is convergent. Convergent synthesis involves building the molecule in an inward fashion, beginning with what will be the exterior branches for the final structure. During convergent synthesis, the dendritic structure grows through successive coupling reactions to form increasingly larger branched structures. The final coupling reaction creates the final focal point (also referred to as the apex or core) of the final dendritic structure. Some highly dendritic structures have been reported to have been manufactured by convergent synthesis. Similar to the situation with divergent synthesis, however, convergent methods reported to have produced highly dendritic structures may involve isolation and purification between generations, and may also suffer from resulting low yields. This is particularly a problem when attempting to make a highly dendritic structure with a large number of generations of branching or with a high molecular weight. As with divergent synthesis, convergent synthesis has practically been limited to making dendritic structures containing only a small number of generations.

Furthermore, only a very limited number of polymer compositions have been demonstrated as manufacturable by current synthesis techniques, and these compositions often are made with only a small number of generations of branching and/or with a relatively low molecular weight. Attempts to make dendritic compositions with more generations of branching and/or higher molecular weights have often either become too complex and expensive, or resulted in materials that failed to achieve a highly dendritic structure. There has been little reported success in making dendritic structures of vinyl polymers, such as polystyrenes, and especially for making such polymers having a reasonably high molecular weight, a large number of generations of branching and a highly dendritic structure and a narrow polydispersity.

There is a need for synthesis techniques for making dendritic polymers that are less complex and less expensive than current techniques. There is also a need for synthesis techniques better suited for manufacture of dendritic polymers with a large number of generations of branching and high molecular weights. Furthermore, there is a need for dendritic polymers of a greater variety of compositions, and especially for dendritic vinyl polymers of a high molecular weight and narrow polydispersity.

SUMMARY OF THE INVENTION

The present invention addresses problems of the prior art by providing a convergent method for making dendritic polymers. Through careful control of certain reaction conditions, hyperbranched structures are prepared with a multi-generational dendritic structure having a narrow polydispersity. A significant advantage of the present invention is that the dendritic structures may be manufactured in a single pot reaction, without the need for isolation and purification of intermediate products.

The method of the present invention is conducted via a living polymerization in which polymeric precursor segments are convergently coupled together with the use of one or more coupling agent, with the coupled polymeric segments being included in branches of the dendritic structure, typically the exterior branches of the structure. Preferred polymeric precursor segments for inclusion in the branches are those made by a living addition polymerization of ethylenically unsaturated monomers, and particularly of vinyl monomers. As used herein, "vinyl monomers" refers to monomers containing a polymerizable vinyl group. As used herein, "vinyl polymers" refers to polymers made at least in part from vinyl monomers. Especially preferred vinyl monomers for the polymeric precursor segments are styrenic monomers, including styrene and substituted styrenes.

The coupling agent is multi-functional in that it is capable of undergoing multiple reactions to form branch points at which three or more branches are coupled. The coupling agent typically includes at least a first functional group and a second functional group, each of which is capable of reacting in the living polymerization system used with the method of the present invention. In a preferred coupling agent, the first group is a vinyl group capable of undergoing an addition polymerization reaction, and the second group is a different group that is capable of undergoing a different type of reaction to effect the desired branching. A preferred class of coupling agents are substituted styrenes, with the vinyl group as the first group and the second group being a substituent pendant from the benzene ring of the styrene group. A preferred living polymer system is an anionic living polymer system, in which case, a preferred second group for the coupling agent includes a moiety capable of being nucleophilically displaced to effect the desired coupling, such as a halo group.

According to the present invention, the problem of wide polydispersity experienced in the prior art during attempts to make hyperbranched materials in one pot reaction is addressed by the present invention through careful control of reaction of the coupling agent, such that the coupling agent reacts in a manner to promote branching for a dendritic structure with a narrow polydispersity. In a preferred embodiment, control of reaction of the coupling agent is accomplished through slow addition, typically in a continuous manner, of the coupling agent to the reaction mixture over an extended time. Addition of the coupling agent may extend over a time of several minutes, or even an hour or longer. The controlled slow addition of the coupling agent promotes the desired coupling by inhibiting undesirable reactions that lead to a wide polydispersity. Adding the coupling agent all at once has been found to be detrimental. This is believed to be because the reaction of the second group on the coupling agent typically proceeds at a faster rate than the reaction of the first group, which can result in the detrimental effect of prematurely terminating living ends in a manner inconsistent with growth of dendritic structures having a narrow polydispersity.

By adding the coupling agent slowly, however, it has quite remarkably been found that a dendritic structure with narrow polydispersity is promoted, such that the dendritic structure includes an average of at least about 2 generations of branching and a polydispersity index (ratio of $M_w$ to $M_n$) of smaller than about 3. In most instances, the dendritic structure will have an average of at least about 3, 4, or even 5 or more generations of branching. Also, the polydispersity index is most often smaller than about 2, or even smaller than about 1.5, even in the case of a dendritic structure with a high molecular weight and a large number of generations of branching.

In one embodiment, when a particularly large number of generations of branching and/or a particularly large molecular weight are desired, polymeric segments are included in interior branches of the dendritic structure. This may be accomplished by adding additional monomer to the reaction mixture along with the coupling agent. The additional monomer may be the same or different than the monomer from which the polymeric precursor segments are prepared. By varying the ratio of the quantity of additional monomer to coupling agent being added, internal branches of varying sizes may be included in the dendritic structure. The ratio of additional monomer to coupling agent will often be at least about 5 to 1, but may be as high as 50 to 1, or even more, especially when very high molecular weight materials are desired. In this way, the dendritic structure may be made with a very large weight average molecular weight while still maintaining a narrow polydispersity. With the present invention, dendritic structures may be made with weight average molecular weights in excess of about 100,000, 200,000, or even 500,000 or more.

In one embodiment of the present invention, the dendritic structures may be functionalized with a variety of functional groups. Functionalization may occur at the focal point of the dendritic structure, or at the free terminal ends of exterior branches. In many instances, functionalization may be performed in the same reaction pot in which the dendritic structure is prepared. Furthermore, in one embodiment, a plurality of the dendritic structures may be incorporated into a larger molecular structure. Examples of larger molecular structures include those having a star, comb, rod or dumbbell configuration. Some of these larger molecules may have extremely large molecular weights, such as one million or more.

In another aspect, the present invention provides polymeric materials including the dendritic structure manufacturable according to the method of the present invention.

It is an object of the present invention to provide a method for making dendritic polymeric materials in a one-pot operation.

It is a further object of the present invention to provide a method for making dendritic polymeric materials of a wide range of vinyl polymer compositions.

It is another object of the present invention to provide a method for making dendritic polymeric materials from readily available starting materials.

It is another object of the present invention to provide polymers including a dendritic structure having a low polydispersity, and optionally with a high molecular weight, and especially for polyvinyl polymers.

These and other objects of the invention will become apparent from the following detailed description when read in conjunction with drawings and the appended claims.

DETAILED DESCRIPTION

In one aspect, the present invention provides a polymeric material having a molecular structure including one or more of a dendritic structure. The dendritic structure may comprise substantially the entire molecular structure or may be a dendritic group that forms only a part of a larger molecular structure.

Figure 1:
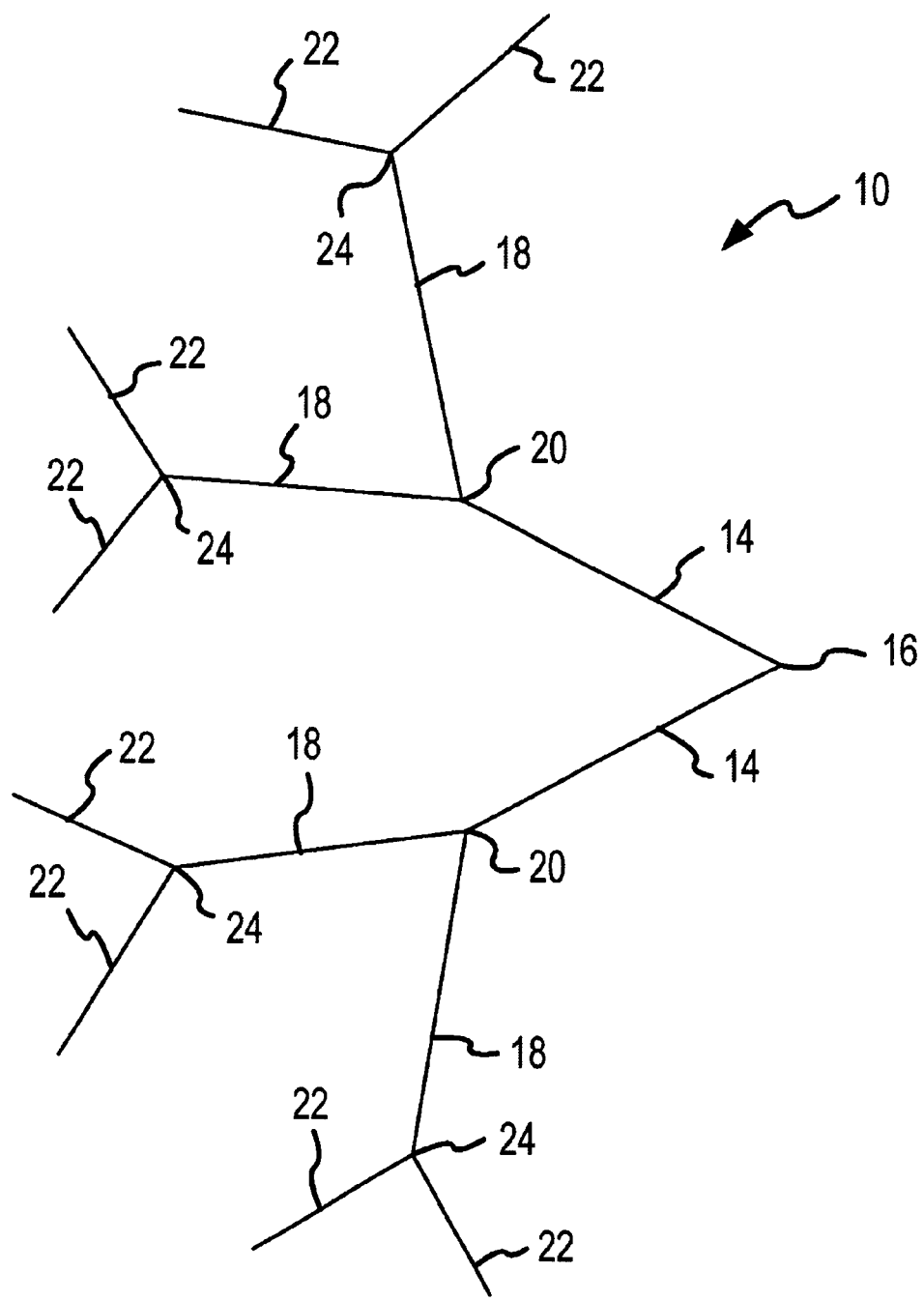
FIG. 1 is a schematic showing an idealized dendritic polymer structure of the present invention including three generations of dendritic branching.

Referring to FIG. 1, an idealized example of a polymeric dendritic structure 10 of the present invention is shown having three generations of branching. A three-generation dendritic structure is shown for ease of description. As will be recognized, the dendritic structure of the present invention will often have more than three generations of branching.

As shown in FIG. 1, the dendritic structure 10 has first generation branches 22, second generation branches 18 and third generation branches 14. The third generation branches 14 are coupled at a branch point 16, which forms the focal point (also referred to as the core or apex) of the dendritic structure 10. Pairs of the second generation branches 18 are coupled with each other and with the third generation branches 14 at branch points 20. Pairs of the first generation branches 22 are coupled with each other and with the second generation branches 18 at the branch points 24. Because the dendritic structures of the present invention are typically formed by convergent synthesis, the first generation branches 22 are exterior branches. The second generation branches 18 and the third generation branches 14 are interior branches.

Although the example structure shown in FIG. 1 has only two branches at each branch point, with the present invention there could be three or more branches at each branch point, depending upon the coupling agent used to couple branches, as described in more detail below. As noted, the dendritic structure of the present invention can have more than three generations of branching. For example, a four generation structure would include two of the three generation structures, as shown in FIG. 1, coupled at a new focal point.

In a true or "perfect" dendrimer, branching is regular in that the branches of each generation have the same average composition and length and include a maximum number of branches emanating from each branch point. Although, the structures of the present invention are highly dendritic, they are typically not true dendrimers. Some irregularities, such as variations in branch length and the number of branches at each branch point, may occur. For example, during the synthesis imperfections such as those formed from earlier generation material combining with later general material can occur. The degree of imperfection, however, may be kept quite small or relatively uniform between molecules, as evidenced by the low polydispersities achievable with the dendritic structures of the present invention. As used herein the term "dendritic" refers to a hyperbranched structure, including multiple generations of branching, which has a high degree of regularity in branching, which may approach the regularity in branching of a true dendrimer but which typically includes some irregularities in branching. The degree to which a polymeric structure is considered to be dendritic for the purposes of the present invention is determined by the average number of generations of branching. An important aspect of the present invention is that the dendritic structure has a narrow polydispersity, as indicated by a polydispersity index, as discussed below. Furthermore, the dendritic structure of the present invention includes an average of at least about two generations of branches, typically at least about three generations of branches and, most often, preferably at least about four generations of branches, in a branching network extending outward from a focal point, with a largely uniform number of branches at each branch point. For some applications, the dendritic structure may have an average of five or more generations of branches. More generations are particularly desirable for high molecular weight materials and when a high density of exterior sites are desired for functionalization. Unlike a typical true dendrimer, however, the dendritic structure of the present invention may include different average branch lengths in different generations and may have different branch compositions in different generations. The flexibility of the dendritic materials of the present invention is highly advantageous for tailoring molecular properties for specific applications.

The dendritic structure of the present invention exhibits a low, or narrow, polydispersity, as indicated by a low polydispersity index value for batches of the dendritic structure, and accordingly is considered to be highly uniform. As used herein, "polydispersity" means the amount of variation in molecular structure, including the branch lengths within each generation and the extent of branching from molecule to molecule. The polydispersity index is an indication of a material's polydispersity. As used herein, "polydispersity index" means the ratio of the weight average molecular weight ($M_w$) to the number average molecular weight ($M_n$)

of a material. Preferably, $M_n$ and $M_w$ are determined by gel permeation size exclusion chromatography coupled with multi-angle laser light scattering detection. However, other methods known to those skilled in the art may be utilized to determine $M_n$ and $M_w$. For example $M_n$ can be obtained by osmometry, and $M_w$ can be obtained by light scattering methods. In one embodiment of the present invention, the dendritic structure of the present invention has a polydispersity index of smaller than about 3, preferably smaller than about 2.5, more preferably smaller than about 2.0, even more preferably smaller than about 1.5, still more preferably less than about 1.3, and most preferably less than about 1.2. A surprising and advantageous aspect of the present invention is that the dendritic structure may have a very low polydispersity index even when the dendritic structure includes a large number of generations of branching and even when the dendritic structure has a high molecular weight.

Branch points within the dendritic structure of the present invention preferably occur substantially only at residues of a coupling agent used to manufacture the structure. The coupling agent is a multi-functional compound, as discussed below, which typically has an asymmetrical structure, such that branches are bonded through different types of moieties of the coupling agent. One preferred coupling agent is a substituted styrene monomer, with a substituent on the benzene ring including a nucleophilically displaceable halogen. A particularly preferred coupling agent is vinyl benzylchloride.

Branches in the dendritic structure typically comprise polymeric segments, although nonpolymeric segments could be included in the dendritic structure if desired. The use of polymeric segments for the branches, however, generally permits manufacture of a dendritic structure including a larger number of generations of branching and/or a larger molecular weight. As used herein, a "polymeric segment" means a segment including two or more of at least one repeating unit from polymerization of a monomer, and includes segments that may be considered as oligomeric because they do not contain a large number of the repeating units. Furthermore, the polymeric segments of the branches may be homopolymeric segments, including repeating units from only a single monomer, or may be copolymeric, including repeating units from polymerization of two or more different monomers. Copolymeric segments may have any copolymer structure, including block and random copolymer structures. As used herein, the term "repeating unit" refers to the reaction residue from polymerization or oligomerization of a monomer. Examples of preferred repeating units for polymeric segments include those from addition polymerization through a double bond of an ethylenically unsaturated monomer. The ethylenically unsaturated monomers may be ethylenically mono-unsaturated or ethylenically poly-unsaturated. Preferred ethylenically mono-unsaturated monomers include vinyl monomers, and particularly styrenic monomers, and preferred ethylenically poly-unsaturated monomers include conjugated dienes, such as isoprene. As used herein, styrenic monomers refer to monomers based on the basic styrene molecule. Styrenic monomers include styrene and substituted styrenes, such as those including one or more substituent pending from the benzene ring, preferably in the m or p positions. Preferably, within each generation of branching, the branches have a substantially uniform composition and a substantially uniform length, but the branches of different generations may have different compositions and/or lengths, as noted above. According to the present invention, the branch lengths and branch compositions may be selected to be appropriate for a particular application. For larger structures, especially those including four or more generations, it is preferable to have longer branches to avoid steric constraints.

Typically, polymer segments used for branches of the dendritic structure are substantially linear polymeric segments. Although polymeric segments are preferred for all branches of the dendritic s structure, the present invention also includes dendritic structures in which some or all of the interior branches include only the branching portions of coupling agent residue, or include other nonpolymeric groups located between the coupling agent residues. Furthermore, the composition or length of branches in one generation of branches may be different than one or more other generations of branches.

In a preferred embodiment, the branches are bonded to coupling agent residues substantially only via C—C bonds. This will typically be the case for branch polymer segments from addition polymerization of ethylenically unsaturated monomers. In another preferred embodiment, the polymer segments of the branches are substantially linear branches with a carbon chain backbone, which will be a polyvinyl backbone in the case of vinyl monomers. Furthermore, in one preferred embodiment, except for functional groups that may be attached to the ends of exterior branches, or to the focal point of the dendritic structure, substantially the entire dendritic structure is a hydrocarbon structure, including substantially no heteroatoms such as oxygen or nitrogen. With the dendritic structure of the present invention the branches are preferably substantially not crosslinked.

Figure 2:
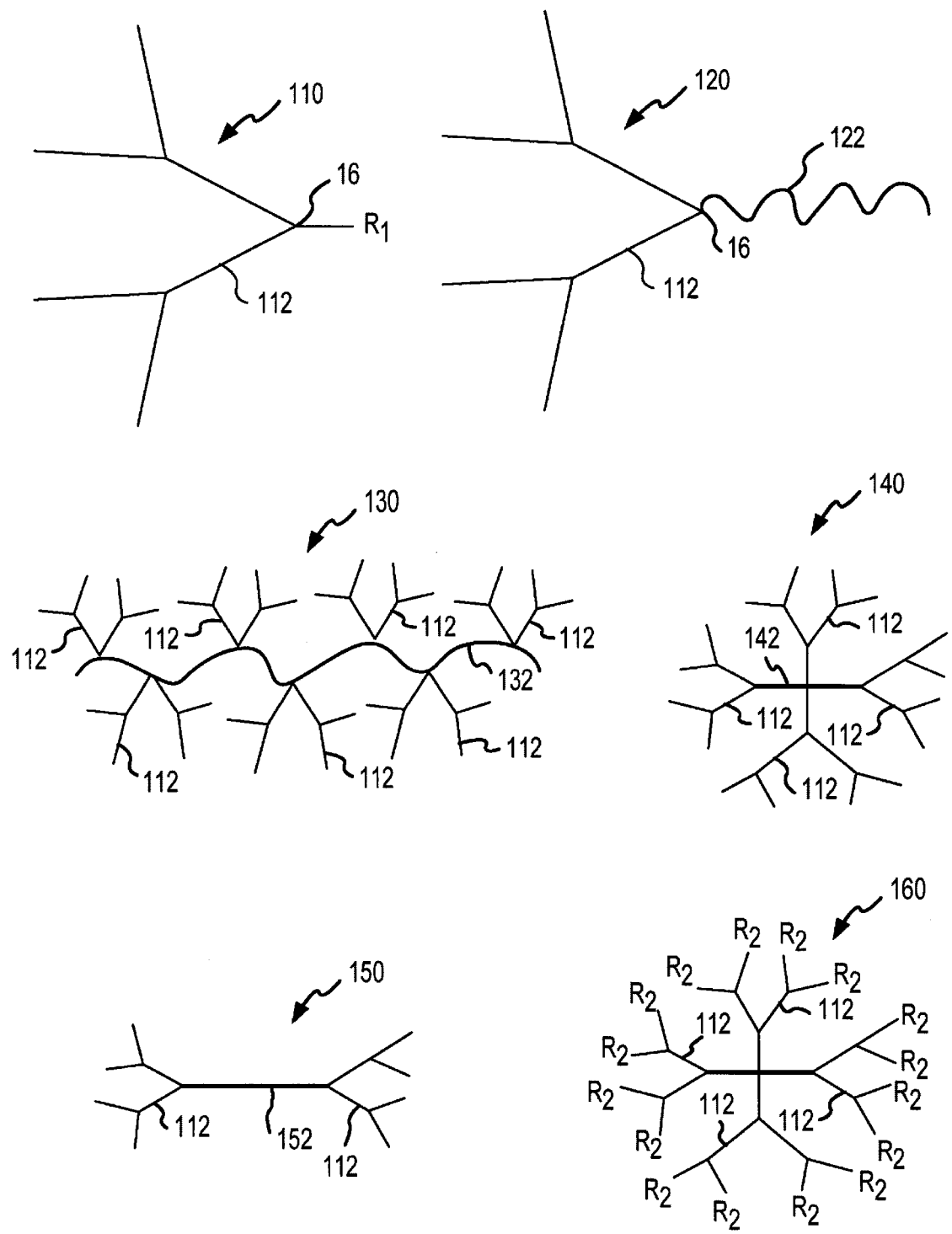
FIG. 2 is a schematic showing several different structures of larger molecules including as subunits one or more dendritic polymer structure of the present invention.

The dendritic structure of the present invention can be made in the form of a dendritic molecule including substantially only the dendritic structure, or the dendritic structure may be a dendritic group incorporated into larger molecules as may be desired for a particular application. Referring to FIG. 2, a number of examples of possible molecular structures incorporating one or more dendritic groups of the present invention are shown. The polymeric molecule 110 includes a single dendritic group 112 and including another group $R_1$ attached to the focal point 16 of the dendritic group. $R_1$ may be any compatible group with any desired functionality. Examples of some functionalities that may be included in $R_1$ include a vinyl, alcohol, diene, carboxylic acid, amine, or aldehyde functionalities. Furthermore, $R_1$ could be ionic, in which case it could be associated with an oppositely charged counterion. The polymeric molecule 120 includes a long chain polymer or other large molecular weight group 122 attached to the focal point 16 of the dendritic group 112. Polymeric molecule 130 is a comb or rod-shaped molecule including a number of the dendritic groups 112 attached to and pendent from a polymer backbone chain 132. The polymeric molecule 140 is a star-shaped molecule including four of the dendritic groups 112 attached to a tetrafunctional core group 142. Polymeric molecule 150 has a dumbbell shape including two of the dendritic groups 112 attached to opposing ends of a long chain segment 152. Polymeric molecule 160 is a star-shaped molecule including four dendritic structures 112, similar to the polymeric molecule 140, except with the exterior branches of the dendritic groups 112 being functionalized with a group $R_2$, which may be any compatible group providing any desired functionality, in a manner as discussed above with respect to $R_1$. The dendritic groups 112 shown in FIG. 2 are shown with only two generations of branching for ease of illustration. Typically, the dendritic structures of the present invention will include a larger number of generations of branching, as discussed previously.

As noted previously, in addition to a low polydispersity, the dendritic structure of the present invention can be manufactured to have a high molecular weight. Although the molecular weight will depend upon the specific application, even with only three generations of branching the dendritic structures will, for most applications, typically have a weight average molecular weight of larger than about 3,000, preferably larger than about 5,000, more preferably larger than about 10,000, even more preferably larger than about 15,000 and most preferably larger than about 20,000. It will be appreciated that the molecular weight will vary depending upon the specific composition, the lengths of the branches, and the number of the branches in the dendritic structure. For higher molecular weights, at least four generations of branching are preferred. In one embodiment, with a large number of generations of branching and/or careful control of the molecular weight of interior branches, the dendritic structure may have a weight average molecular weight of larger than about 50,000, preferably larger than about 100,000, more preferably larger than about 150,000 and even more preferably larger than about 200,000, depending upon the particular application. When relatively long polymeric segments are included in the interior and/or exterior branches, it is possible to make the dendritic structure with a weight average molecular weight of larger than about 300,000 or even larger than about 500,000, as discussed more fully below. In the case of large molecular structures including a plurality of dendritic structures, such as for molecules 130, 140, 150 and 160 as shown in FIG. 2, weight average molecular weights will often be larger than about 100,000, preferably larger than about 250,000, more preferably larger than about 500,000 and most preferably larger than about 1,000,000, depending upon the particular application.

As will be readily appreciated, each exterior branch of the dendritic structure of the present invention has a free terminal end providing a site for functionalization. These free ends may be functionalized, either before or after synthesis of the dendritic structure to include functional groups suitable for enhancing the utility of the final molecule for particular applications. Referring again to FIG. 2, the star-shaped molecule 160 includes as radiating arms the four dendritic structures 112 having the functional group $R_2$ attached at the terminal ends of the exterior branches. $R_2$ could be chosen, for example, to function as a site for ion exchange, chelation or complexation, when the molecule 160 is to be used as an ion exchange resin or as a ligand. As another example, $R_2$ could be an electrolytic group, when the molecule 160 is to be used as a polyelectrolyte. As yet another example, $R_2$ could be selected so that the molecule will behave as a uni-molecular micelle in a selected liquid medium, and the dendritic structure in the interior of the micelle could be used to trap substances insoluble in the selected liquid medium. For example, $R_2$ could be a hydrophilic polar or ionic group that would maintain an otherwise hydrophobic dendritic polymer dispersed as uni-molecular micelles in aqueous liquids, and a hydrophobic drug or other molecules could be partitioned into the interior of the micelle. As a further example, $R_2$ could be selected to provide desired properties, such as facilitated transport of a material when the molecule 160 is used in a polymer membrane. As another example, $R_2$ could be selected to enhance or diminish the solubility of the molecule 160 in one or more selected solvents. Furthermore, $R_2$ could be selected for affinity for adsorption onto a selected surface. Moreover, $R_2$ could be a crosslinkable group for crosslinking the dendritic structure with other polymer molecules in a larger crosslinked structure.

The various types of functional groups that could be used and the manners in which such functional groups may be attached to the exterior branches include those that are well known in the art. Functionalization of the exterior branches may be accomplished before, during or after synthesis of the dendritic structure. Functional groups $R_2$ can be placed on the terminal ends of exterior branches by the use of properly functionalized initiators or by the use of initiators which yield functional groups upon subsequent reactions. Functional groups can also be placed at the exterior of the dendritic molecule by initiating and polymerizing monomers which can be viewed as functionalized or can generate functional groups in subsequent reactions. Examples of such functional groups for the cases where the functionality is derived either from an initiator or from the monomers include amine, alcohol, phenol, vinyl, diene, carboxylic acid, ionic groups, and zwitterionic groups. Also, it should be recognized that although a star-shaped molecular structure is shown in FIG. 2 as an example of a functionalized molecule, functional groups could be attached to the exterior branches of any molecular structure, including a molecular structure comprising substantially entirely only a single dendritic structure.

One important use of the composition of the present invention is to modify the viscosity of a material into which it is included. For example, the composition can be added to a polymer melt prior to molding or extrusion. Such melt processing of compositions including the dendritic structure of the present invention and articles manufactured by such processing are within the scope of the present invention. If the composition lowers the viscosity of the melt, it may be possible to decrease energy requirements for the molding or extrusion process, either by lowering the process temperature or by decreasing the pumping requirements, or both. Also, in some circumstances, it has been found that the addition of relatively small quantities of the dendritic structure to a polymer melt can have a viscosity-increasing effect, even though the addition of larger quantities tends to decrease viscosity. Therefore, it is possible to use the dendritic structure as a viscosity-increasing addition when increased viscosity may be desirable, such as for blow molding. The inclusion of the composition of the present invention into materials may also improve the impact properties of the material or may render the material useful in the manufacture of polymer membranes.

Figure 3:
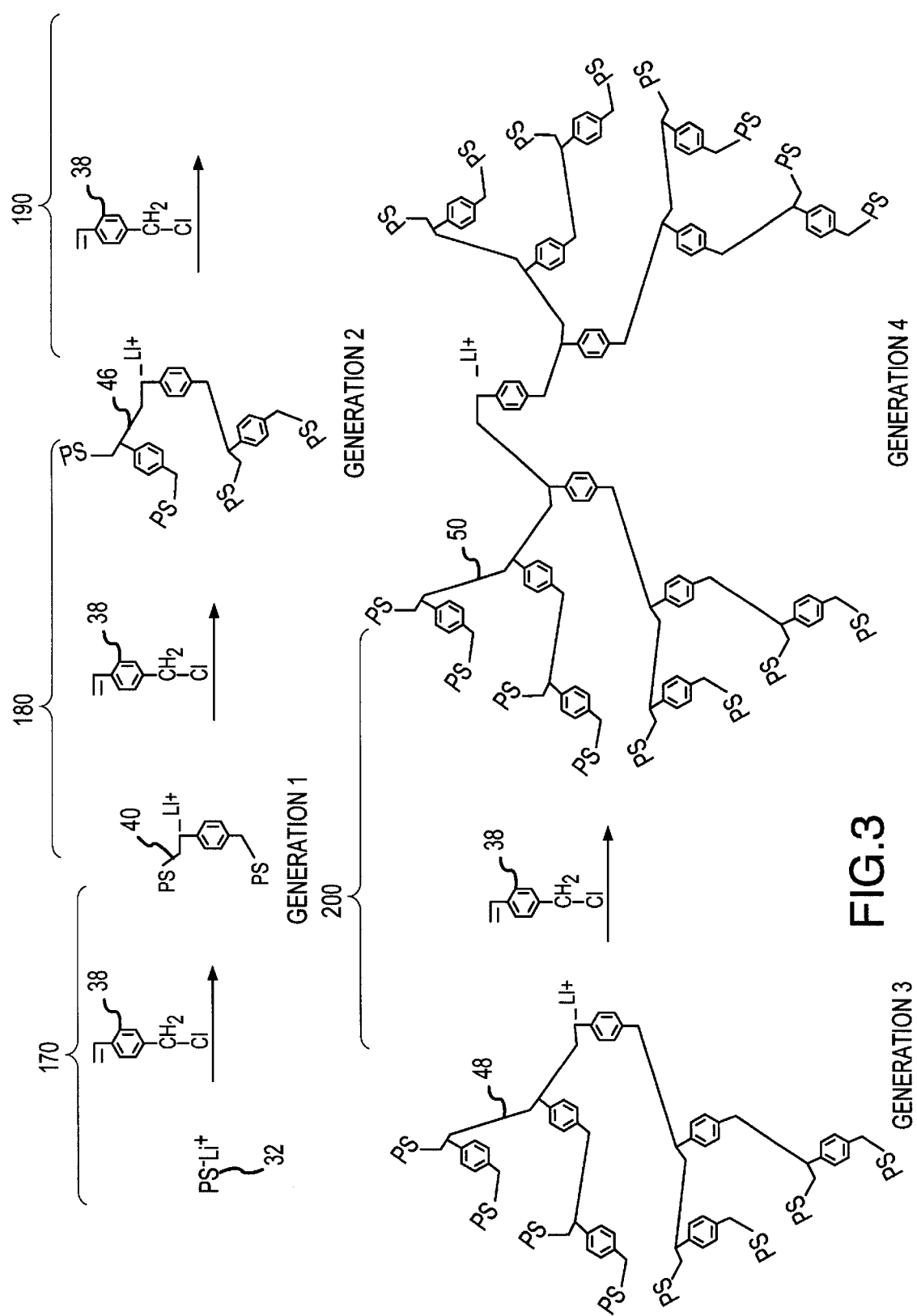
FIG. 3 is a schematic showing an idealized reaction sequence for convergent synthesis of a dendritic structure in accordance with the present invention.

In another aspect, the present invention provides a convergent method for making dendritic polymer structures, such as those described above. The convergent method is advantageously conducted in a living polymerization, preferably anionic living polymerization, although other living polymerization systems may alternatively be used. Referring now to FIG. 3, an idealized reaction sequence for an embodiment of the process of the present invention conducted via anionic living polymerization is shown, which is exemplified using polystyrene segments for the exterior branches and vinyl benzylchloride as the coupling agent, for making a dendritic polystyrene (PS) with four generations of branching and using an alkyl lithium compound as an initiator. The discussion provided here, however, applies equally to making dendritic structures of other compositions, or with more or fewer generations of branching.

As shown in FIG. 3, in a first step 170, polystyrene precursor segments 32, each having an anionic living end (shown in association with a lithium cation supplied by the initiator) coupled in pairs with the coupling agent 38 to form first generation branched units 40. The first generation branched units 40 include a single anionic living end. The polystyrene precursor segments 32 in the living polymerization mixture may have been previously prepared by methods as are well known in the art through anionic addition polymerization of styrene monomer using an alkyl lithium initiator. The relative amounts of styrene monomer and initiator are selected to provide the polystyrene precursor segments 32 of a desired length for the exterior branches of the ultimate dendritic structure. The vinyl benzylchloride coupling agent 38, as shown in FIG. 3, has two functional groups, a first functional group being a vinyl group and a second functional group being a chloromethyl group. The vinyl group of the coupling agent reacts with one polystyrene segment 32 in an addition reaction, and another of the polystyrene segments 32 reacts with the chloromethyl group of the coupling agent 38 in a nucleophilic displacement reaction, with elimination of the chlorine of the chloromethyl group.

In a second step 180, the first generation branched units 40 are then coupled in pairs with additional coupling agent 38 to form second generation branched units 46. The second generation branched units 46 each include a single anionic living end.

In a third step 190, the second generation branched units 46 are coupled in pairs with additional coupling agent 38 to form third generation branched units 48, which each has a single anionic living end. In a fourth step 200, the third generation units 48 are then coupled in pairs using additional coupling agent 38 to form fourth generation branched units 40, each having a single anionic living end. As seen in FIG. 3, the original polystyrene precursor segments 32 have become the exterior branches in the final dendritic structure. The unattached terminal ends of the exterior branches are available for functionalization, if desired.

In this example, a four generation dendritic structure is the final product, and the polymerization would be terminated after the fourth step 200 in any manner known in the art for terminating anionic living ends. If, however, five or more generations of branching were desired, one or more additional coupling steps could be performed to make a dendritic structure with more than four generations.

As seen in FIG. 3, the branched units of each generation of coupling include only a single living end, with a result being that the total number of living ends in the reaction mixture is reduced with each new generation of branch coupling. In the idealized example shown, the number of living ends is reduced by one-half between generations. Maintaining a single living end on substantially each branched unit at each generation of coupling is very important to production of highly dendritic structures according to the present invention. Careful control of reaction conditions, typically through careful control of the addition of the coupling agent, is required with the present invention, as discussed in more detail below. It should be recognized that the reaction sequence shown in FIG. 3 is idealized. In that regard, the steps 170, 180, 190 and 200 are not normally accomplished as separate process steps, but represent different reaction steps in a reaction sequence to make the dendritic structures of the present invention. In actuality each generation is not necessarily completely formed before the start of the next generation. Moreover, some defects will occur, which is why the dendritic structures of the present invention are not true dendrimers.

As noted, the precursor segments for the exterior branches shown in FIG. 3 are polymeric. The initial precursor segments could, however, be monomeric if desired, although polymeric precursor segments are preferred. Also, polymeric precursor segments may be of any convenient length or molecular weight and may include any desired number and type of repeating units. Linear polymeric precursor segments may be initially formed of a desired size by starting with a monomer and an initiator in relative quantities selected to form a predetermined segment length in a chain-growth process, and allowing the chain-growth process to proceed to completion prior to initiating coupling reactions to form the branched units. Preferably, however, the polymeric precursor segments 32 have an average degree of polymerization of at least 5, meaning that on average, the precursor polymer segments include at least 5 repeating units. Preferably the average degree of polymerization for the polymer precursor segments is at least 10 and more preferably at least 20. In some instances, however, it may be desirable to start with very large polymeric precursor segments, especially when making very high molecular weight materials. In that regard the polymeric precursor segments 32 may include an average of at least about 50 or even at least about 100 repeating units.

Figure 4:
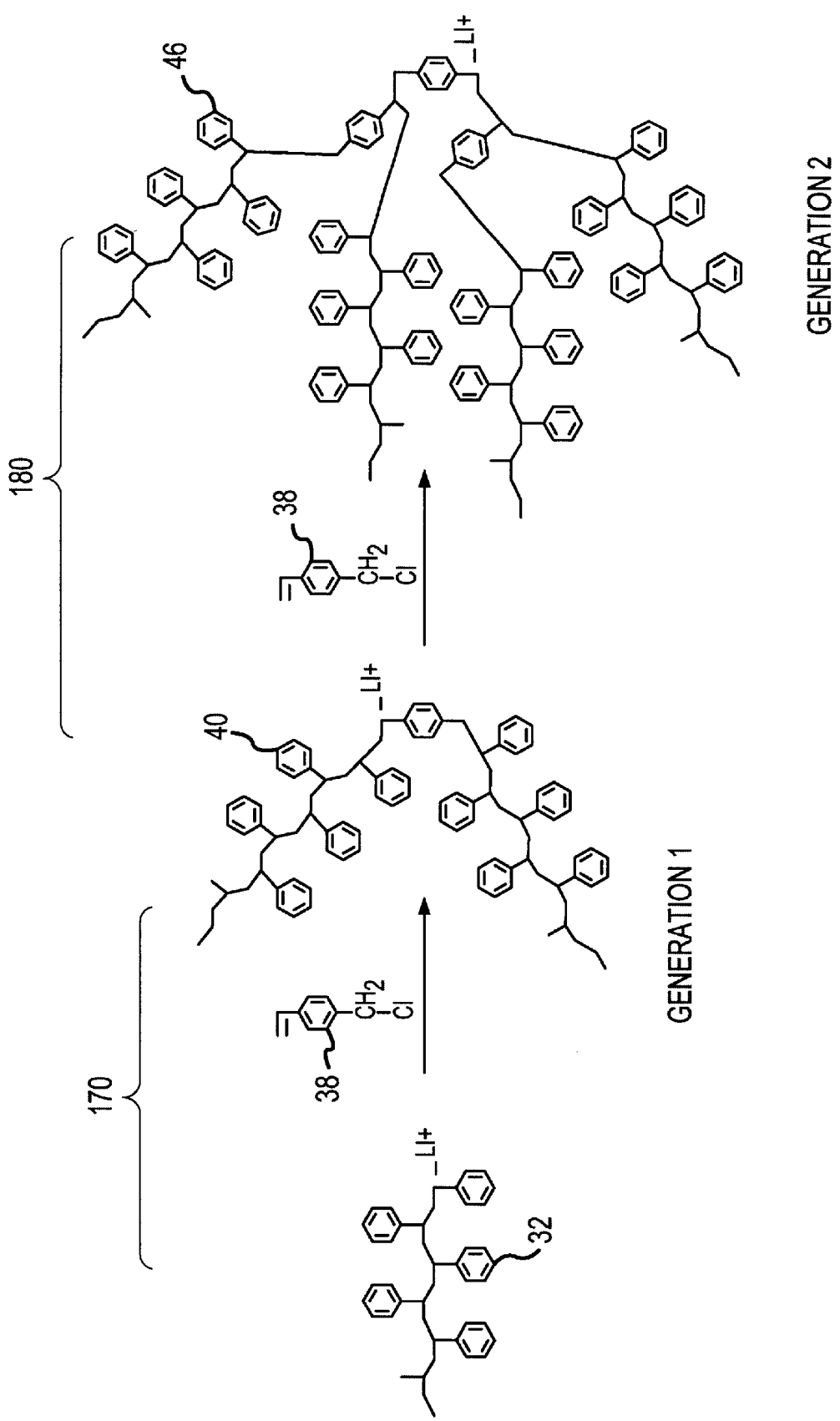
FIG. 4 is a schematic showing an idealized reaction sequence for synthesis of a two-generation dendritic polymeric structure of the present invention having exterior branches formed from linear polystyrene segments in accordance with the present invention.

Referring now to FIG. 4, an example is shown for the first two steps 170 and 180 in making dendritic polystyrene materials beginning with the precursor polystyrene segments 32 including an average of five styrene repeating units. Reference numerals shown in FIG. 4 are the same as those shown on FIG. 3.

As noted above, with the present invention it is important to carefully control the reaction of the coupling agent to prepare the desired highly dendritic structure. In particular, the reaction of the coupling agent is generally controlled by slow addition of the coupling agent to the living polymerization mixture over an extended time, to ensure that there is always a stoichiometric excess of living ends. The rate at which the polymerizable first functional group (e.g., the vinyl group) of the coupling agent reacts with a living end to form a new living end is much slower than the rate at which the second functional group (e.g., the chloromethyl group) reacts, which reaction of the second functional group does not result in formation of a new living end. Thus, the first reaction (e.g., nucleophilic substitution of chlorine) of the coupling agent destroys a living end, and the second reaction (e.g., the anionic polymerization through the vinyl group) of the coupling agent results in formation of a new living end. Adding the coupling agent too rapidly, therefore, results in termination of too many of the living ends, leaving too few remaining living ends to react with the polymerizable functional groups (e.g., the vinyl groups) of the coupling agent to form the desired next generation of branched units, with a result being that units in the living polymerization mixture would not maintain a uniform size and branching configuration, as has been described with reference to FIGS. 3 and 4. Slow addition of the coupling agent permits the convergent synthesis to proceed with uniform coupling of branched units through multiple generations to form highly dendritic structures according to the present invention.

As noted, the coupling agent should be slowly added to the reaction mixture over an extended time. This may be accomplished by continuous addition of the coupling agent over an extended time or by stepwise addition of the coupling agent in several additions over an extended time. Normally, addition of the coupling agent will extend over a time of at least about 10 minutes, and may extend over a time of an hour, or even several hours or more.

Ideally, the coupling agent would be added one molecule at a time to ensure complete reaction of both functional groups on the coupling agent, and, accordingly, maximum branching and continued growth of the dendritic structure. Although this ideal cannot practically be achieved, the ideal situation is approached if the coupling agent is added slowly enough that the number of living ends lost to termination is very small. The slow addition of the coupling agent not only results in a highly branched and regular dendritic structure, but it also avoids wasting the coupling agent, because substantially only the amount of coupling agent required for branch points in the dendritic structure need be added to the reaction mixture. For a coupling agent with a first polymerizable functional group (e.g., the vinyl group) capable of coupling two branches and a second functional group (e.g., the chloromethyl group) capable of coupling one additional branch, the total ratio of coupling agent used to precursor segments for the exterior branches is 1. If the ratio is substantially less than 1, there will be a substantial excess of living chain ends and low dendritic growth, and if the ratio is greater than 1, there will be an excess of coupling agent.

In the process as described with reference to FIGS. 3 and 4, the interior branches are comprised of only residue from the coupling agent. In one embodiment of the present invention, however, the length of some or all of the interior branches may be increased by the addition of polymeric segments in the interior branches. This will tend to result in the manufacture of dendritic structures of a higher molecular weight. This technique is desirable for making dendritic structures with a large number of generations of branching, and particularly for making dendritic structures including five or more generations of branching.

To obtain the polymeric segments for interior branches, additional monomer can be added along with the coupling agent over an extended time. Addition of the additional monomer results in polymerization of the monomer onto the living end of one generation of coupled branches to increase the length of interior branches in the next generation. The quantity of monomer used relative to the coupling agent can be selected to obtain the desired increase in branch length, or molecular weight. An alternative way to obtain the polymeric segments in interior branches is to add the monomer alone between stepwise additions of the coupling agent. In this way, the interior branches are permitted to grow prior to adding the coupling agent for the next generation of coupling. In either case, a plurality of different monomers can be added, either with the coupling agent or between stepwise additions of the coupling agent, to obtain copolymeric interior branches. By increasing the length of interior branches, the stearic interaction between branched units may be sufficiently reduced to permit manufacture of very large dendritic structures, such as those having five or more generations of branching. When a generation of branching includes interior branches having polymeric segments, the segments preferably include a degree of polymerization such that the average polymeric segment in the interior branches of the generation has at least two repeating units, preferably at least about five repeating units and more preferably at least about 10 repeating units. For making particularly high molecular weight dendritic structures, the polymeric segments for interior branches may have at least about 20 repeating units, at least about 50 repeating units, or even at least about 100 repeating units, or more.

Figure 5:
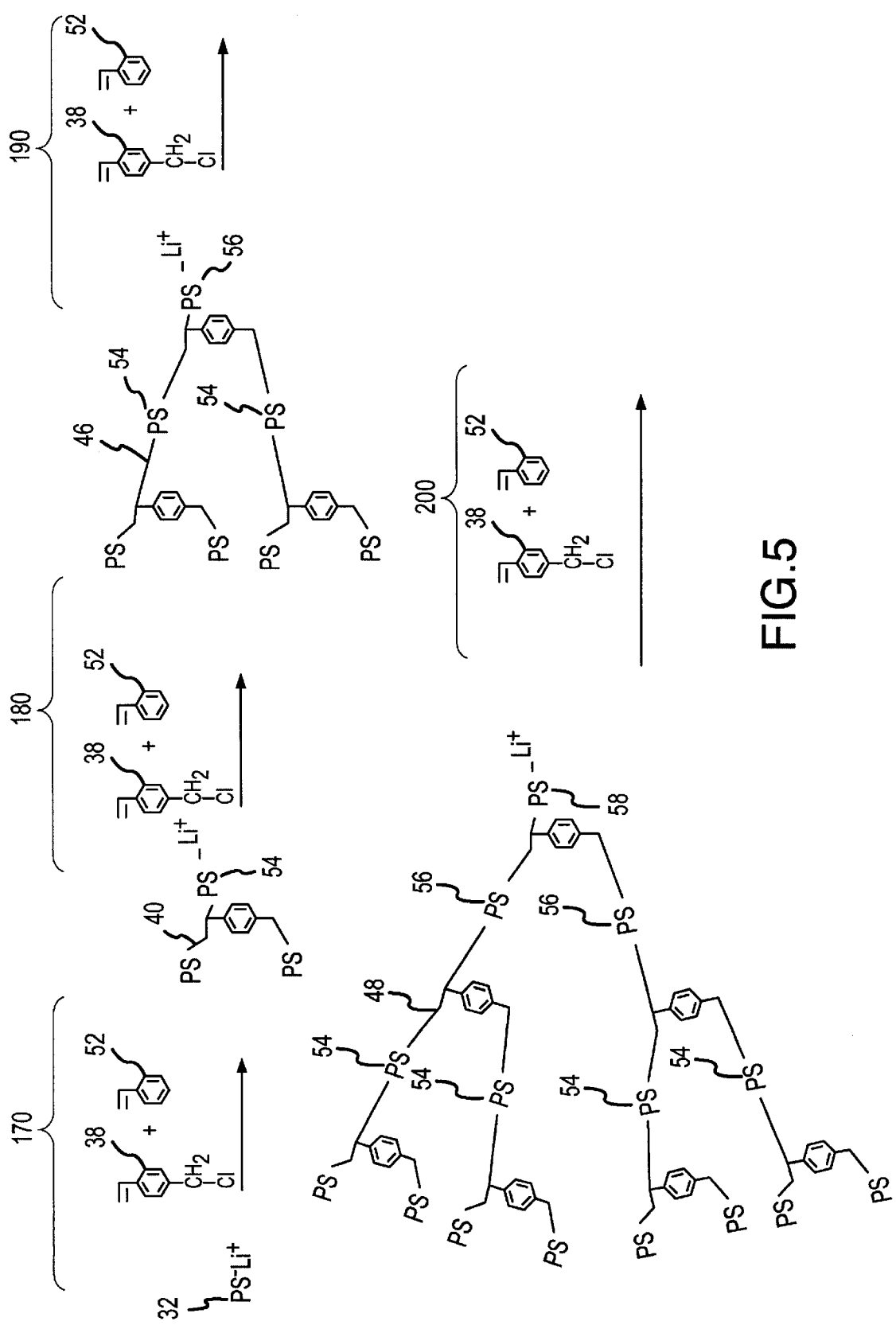
FIG. 5 is schematic showing an idealized reaction sequence for convergent synthesis of a dendritic structure, in accordance with the present invention, having interior and exterior branches which include linear polystyrene segments.

Referring now to FIG. 5, an idealized reaction sequence is shown for making dendritic polystyrene including polystyrene segments in interior branches. Reference numerals are the same as those used in FIGS. 3 and 4, except as noted. As seen in FIG. 5, during the first step 170, monomer 52 (in this case styrene monomer) is added along with the coupling agent 38 (in this case vinyl benzylchloride) to form the first generation branched units 40. During the first step 170, at least a portion of the monomer 52 will polymerize to form polystyrene segments 54 on the first generation branched unit 40. Some of the monomer 52 may contribute to chain growth of the precursor polymeric segments 32. When the first generation branched units 40 are then coupled during the second step 180 to form the second generation branched units 46, the polystyrene segments 54 are included in the interior branches of the second generation branched units 46. Also, during the second step 180, additional monomer 52 is added along with the coupling agent 38 to form the polystyrene segments 56 on the second generation branched units 46. When the second generation branched units 46 are coupled during the third step 190, the third generation branched units 48 are formed including the polystyrene segments 56 in interior branches. Adding additional monomer 52 during the third step 190 results in formation of polystyrene segments 58 on the third generation branched units 48. When the third generation branched units 48 are coupled during the fourth step 200, the polystyrene segments 58 are included in interior branches of fourth generation branched structures (not shown). Also, when additional monomer 52 is added during the fourth step 200, then the focal point of the fourth generation branched structure will be attached to a polystyrene segment having an anionic living end.

Although FIG. 5 shows monomer 52 being added in every one of steps 170, 180, 190 and 200, the monomer could instead be added during one or more of the steps, but not during all of the steps. Also, although only styrene monomer is shown as being added in FIG. 5, different monomers could be added during different steps to make interior branches having different compositions in different generations. Furthermore, multiple different monomers could be added at a time to make interior branches including copolymer segments. Moreover, the exterior branches need not have the same composition as interior segments.

As noted previously, the additional monomer 52 and the coupling agent could be added together, typically by way of a slow, continuous addition over an extended time. The addition of the additional monomer 52 and the coupling agent 38 could, however, proceed in alternating stepwise fashion. For example, with reference to FIG. 5, the first step 170 could be broken into two successive substeps. In a first substep, the coupling agent 38 alone could be added to couple precursor polystyrene segments. In a second substep, the monomer 52 alone could be added to form the polystyrene segments 54 on the first generation branched units 40. The second step 180, third step 190 and fourth step 200 could likewise each be divided into substeps.

Although the convergent synthesis method of the present invention has been described with reference to FIGS. 3–5 for synthesis of dendritic structures using polystyrene polymer segments for branches and vinyl benzylchloride as the coupling agent, the same principles apply to any other polymer segments and any other compatible multifunctional coupling agents that may be similarly processed via a living polymerization. Furthermore, although the process has been described with reference to FIGS. 3–5 as a living anionic polymerization, the same principles apply to other living polymerization systems that could alternatively be used, including cationic, coordination and free radical living polymerizations. Anionic and cationic polymerizations are preferred, with anionic polymerization being more preferred for most applications. Moreover, the process has been described with respect to the use of styrene monomer, which polymerizes through a vinyl addition reaction. The invention is not, however, limited to vinyl addition polymerization. Other monomers polymerizable in a living polymerization system may be used to make dendritic structures of the present invention. For example, monomers polymerizable in a living system via ring-opening polymerization or group-transfer polymerization could also be used.

The initial polymeric precursor segments, which ultimately form exterior branches, and polymeric segments of interior branches can be formed from any monomers capable of reacting with the first functional group of the coupling agent in a living polymerization reaction, for example via an anionic, cationic, coordination, or free radical mechanisms. The resulting polymer living chain ends must also be capable of reacting with the coupling agent via a coupling reaction with the second functional group of the coupling agent.

Nonlimiting examples of suitable monomers for anionic addition polymerization include styrene; alkyl-substituted styrenes, alkyl ether-substituted styrenes, silyl ether-substituted styrenes, aryl ether-substituted styrenes, alkyl (alkyl) acrylates, aryl (alkyl) acrylates, ethylenically mono-unsaturated nitriles, vinyl alkyl ketones, substituted and unsubstituted conjugated dienes, and vinyl pyridines. The coupling agent can be any compound with a first functional group including an anionically polymerizable double bond, which can polymerize in a living manner under the reaction conditions, and a second functional group capable of undergoing a suitable coupling reaction. Nonlimiting examples of suitable coupling agents for anionic polymerization reactions include m- and p-substituted styrenes, such as vinyl benzylchloride (also known as chloromethyl styrene), bromomethyl styrene, iodomethyl styrene, m- and p-1,2 epoxyethyl styrene, and m- and p-chlorodimethylsilyl styrene; methacryloyl chloride; acryloyl chloride; chlorodimethylsilylalkylmethacrylate; chlorodimethylsilylalkyl acrylate; 2-(bromoalkyl)-1,3-butadiene; 2-(chloroalkyl)-1,3-butadiene; 2-(iodoalkyl)-1,3-butadiene; 2-(chlorodimethylsilyl)-1,3-butadiene; and 2-(chlorodimethylsilylalkyl)-1,3-butadiene.

Nonlimiting examples of suitable monomers for cationic addition polymerization reactions include styrene; alpha-alkyl styrenes; m- and p-alkyl substituted styrenes; m- and p-alkyl ether substituted styrenes; conjugated unsubstituted and substituted alkyl, halo, and haloalkyl dienes; 1,1 dialkylalkenes; alkyl vinyl ethers; aryl vinyl ethers; and N-vinylcarbazole. Suitable coupling compounds for cationic polymerization reactions include compounds with a polymerizable double bond and a second functional group having a nucleophilic species which can quantitatively couple with a living cationic chain end. Nonlimiting examples of suitable coupling compounds include metal salts of m- or p-vinyl phenols, m- or p-vinylbenzoic acid, m- or p-isopropenylphenol, m- or p-isopropenylbenzoic acid, and diethyl(2-(vinyloxy)ethyl)malonate; m- or p-primary or secondary amino styrenes; and m- or p-primary or secondary aminoalkyl vinyl ethers.

Suitable monomers for ring-opening polymerization reactions include those that can ring-open polymerize in a living manner by anionic, cationic, or coordination mechanisms and include ethylene oxide, substituted ethylene oxides, ethylene sulfide, substituted ethylene sulfide, tetrahydrofuran, oxetane, substituted oxetanes, oxazoline, and 2-substituted oxazolines. Suitable coupling compounds include compounds which can both react in a coupling manner with a living chain end and a group which can react with a living chain end to regenerate a new living chain end.

Nonlimiting examples of suitable monomers include epichlorohydrin, 2-aminoalkyloxazolines, 2-alkylaminoalkyloxazolines, metal salts of carboxylic acid substituted oxetanes, metal salts of carboxylic acid substituted tetrahydrofuran, and primary and secondary amine substituted oxiranes, oxetanes and tetrahydrofurans.

Nonlimiting examples of suitable monomers for ring-opening metathesis polymerizations include norbornene and substituted norbornene. Nonlimiting examples of suitable coupling compounds for ring-opening metathesis polymerizations are those which contain functional groups which can quantitatively couple with the living chain end and can react with the living chain end to regenerate a new living chain end and include aldehyde or ketone substituted norbornene, such as 5-norbornene-2-carboxaldehyde and 2-benzoyl-5-norbornene.

Nonlimiting examples of suitable monomers for use in group transfer reactions include methyl methacrylate or other substituted methacrylates or acrylates, such as t-butylmethacrylate. Suitable coupling compounds are any compound which can couple with the living chain end and react with the living chain end to regenerate a new living chain end and include acryloyl chloride, methacryloyl chloride, chlorodimethylsilylalkylmethacrylate, chlorodimethylsilylalkyl acrylate, and haloalkyl substituted acrylates or methacrylates.

Coupling agents for living free radical polymerization include any compound with a free radically polymerizable group and functionality capable of reacting with the living chain end to couple with the living chain end. Such functionalities are those capable of reacting with a free radical to generate another free radical which is stable to the reaction conditions or a functionality that is itself a free radical.

As noted previously, when a dendritic structure of the present invention has grown to the desired molecular weight and/or number of generations, the polymer may be terminated by a terminating reaction at the focal point. Termination may be effected in any manner and using any termination reaction known in the art for terminating living polymerizations. An acidic proton from water, alcohol or acid could effect termination without functionalization. Frequently, however, the polymer will be terminated with a functional group to provide a desired functionality at the focal point. Examples of some functionalities that could be provided during termination include vinyl, alcohol, carboxylic acid, and epoxide functionalities. For example, a vinyl functionality could be accomplished by adding excess coupling agent to the reaction vessel. A carboxylic acid functionality could be formed by the addition of carbon dioxide to the living polymer mixture. An epoxide functionality could be formed by the addition of an excess of epichlorohydrin. A dialcohol can be formed by the addition of an excess of epichlorohydrin followed by sulfuric acid. An alcohol group can be formed by termination with ethylene oxide. Similar functionalities can be obtained in other living polymerization systems, as is known in the art. Furthermore, even after termination, additional reactions could be conducted at the focal point to change the functionality from that introduced during termination. Moreover, reactions may be conducted at the free terminal ends of the external branches to provide any desired functionality on the terminal branches. The terminated polymer can be recovered from the reaction mixture by any suitable method, as is known in the art.

Figure 6:
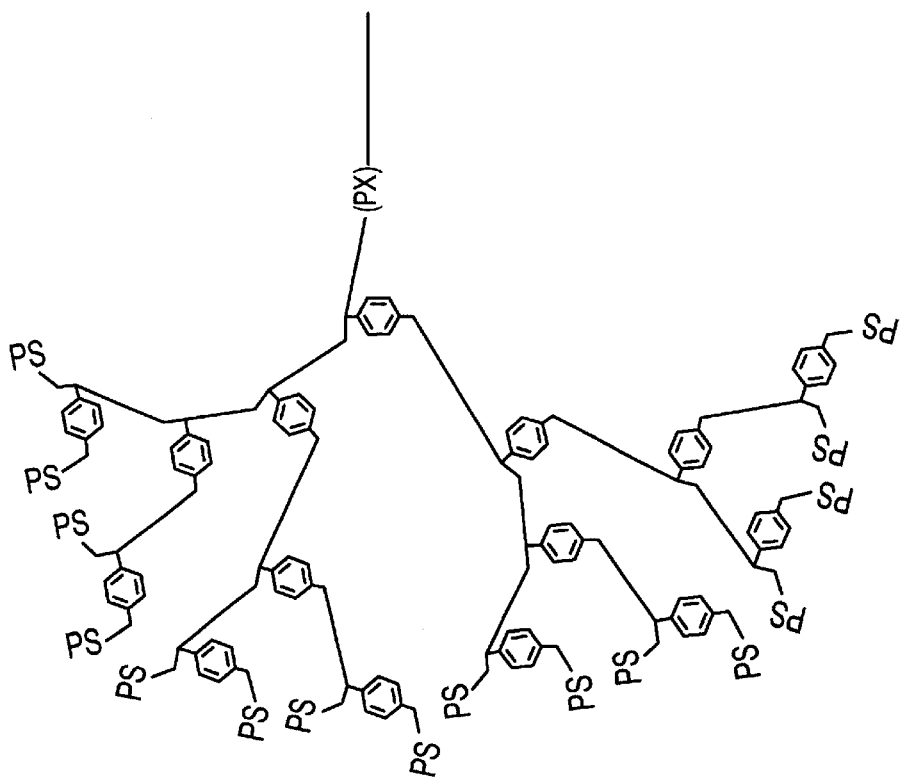
FIG. 6 is a schematic showing a reaction sequence for attaching a long chain polymer tail to the focal point of a dendritic structure of the present invention.
Figure 6:
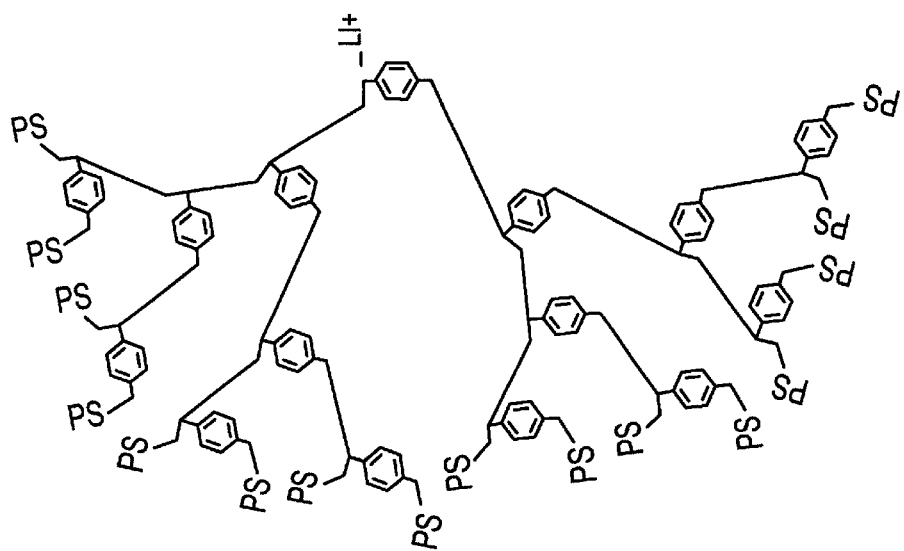

As discussed previously, one or more of the dendritic structures of the present invention can be incorporated into a larger molecular structure. This can often advantageously be accomplished in the same reaction pot as the living polymer synthesis to make the dendritic structure. For example, the dendritic structure could be grafted onto a backbone either before or after termination. The backbone could be polymeric or nonpolymeric. Also, a long chain polymeric tail could be added to the focal point of the dendritic structure by polymerizing additional monomer(s) (which may be the same or different from monomers used to make the dendritic structure). This additional polymerization could be accomplished in the same synthesis pot, either before or after termination of the living ends of the dendritic structures. Referring to FIG. 6, an example is shown in which a polymer tail (PX) is added to the focal point of a dendritic structure in an anionic polymerization. The polymer tail may be formed by adding an anionically polymerizable monomer (X) to the living anionic dendritic structure in the same synthesis pot in which the dendritic structure was made. Some examples of such monomers (X) include styrene, substituted styrenes, alkyl methacrylates, alkyl acrylates, vinyl pyridines, dienes, ring opening monomers like hexamethylcyclotrisiloxane, and other monomers known to polymerize anionically.

EXAMPLES

The invention is further illustrated by the following examples, which are intended solely to aid in the understanding of the invention and not to limit the scope of the invention as set forth in the claims.

For these examples, styrene, isoprene, vinyl benzylchloride (VBC) (mixture of 3 and 4 isomers), p-chlorostyrene, and dichloridimethylsilane are dried over calcium hydride and distilled under argon or under reduced pressure immediately before use. sec-Butyl lithium (1.45 M, 11.9% w/w in hexane) is used as received. Tetrahydrofuran (THF) is dried over sodium and distilled from sodium benzophenone ketyl immediately prior to use. Cyclohexane is purified as known in the art and distilled from sodium metal. 4-(chlorodimethylsilyl) styrene (CDMSS) is prepared by a Grignard reaction involving p-chlorostyrene and dichlorodimethylsilylstyrene in THF in a manner similar to the procedure reported by Leebrick and Ramsden in *J. Org. Chem.* 1958, 23, 935. The Grignard reagent of p-chlorostyrene is added to an excess of dichloridimethylsilane in THF, and the product is purified by fractional distillation. All reactions are conducted under inert atmosphere. Glassware is oven dried for at least 24 hours, flamed, and cooled under argon prior to use.

Molecular weights are determined by gel permeation chromatography (GPC) coupled with a multi-angle laser light scattering (MALLS) detector. GPC is performed on a Hewlett-Packard Model 1084B liquid chromatograph equipped with a Hewlett-Packard Plgel 5μMixed-D column. Elutions are carried out at ambient temperature with THF as solvent at a flow rate of 0.70 ml/min. The MALLS detector is a Wyatt Technology miniDAWN. The ratio of dn/dc, the refractive index increment or change of refractive index with changes in concentration, for the samples is determined by integration of the refractive index peak of a calibrated refractive index detector. For dendritic polystyrene in THF, the values for dn/dc are found to correspond to that of linear polystyrene (0.193), and this is the value used in the calculations. Intrinsic viscosities are measured in THF at 30° C. using a size 50 Cannon-Ubbelohde viscometer. Molecular weights are also determined for some samples by matrix assisted laser desorption ionization (MALDI) mass spectrometry. The values obtained with MALDI correlated well with those obtained by light scattering. UV-Visible spectroscopy was performed using a Perkin-Elmer Lambda II spectrometer.

Example 1

Synthesis of Precursor Polystyrene Segments

Styrene (1.818 g, 17.46 mmol) is charged to a rubber septum-sealed, argon purged, flame dried 100 ml round-bottom flask containing cyclohexane (30 ml) and a magnetic stir bar. The solution is then titrated via syringe with 1.45 M sec-butyl lithium to a pale yellow color indicative of styryllithium. A sec-butyl lithium initiator charge (2.4 ml, 3.48 mmol) is then injected. After thirty minutes, tetrahydrofuran (THF) (10 ml) is added via syringe, and the reaction mixture takes on a dark red color indicative of polystyryllithium. The resulting initiated polystyrene segments each comprise an average of five styrene repeating units and a molecular weight of about 500 g/mole. The chain length can be varied by changing the relative quantities of styrene and sec-butyl lithium to obtain chain lengths with molecular weights at least as great as 20,000 g/mole.

Example 2

Synthesis of Vinyl Terminated Dendritic Polystyrene

Neat chlorodimethylsilylstyrene is added to the precursor polystyrene segments in THF from Example 1 at a slow rate of addition (extending over a time of 3 to 9 hours) by means of a syringe pump. 3.48 mmoles of chlorodimethylsilylstyrene are added, and the reaction mixture loses its red color, indicating that the reaction of polystyryllithium and chlorodimethylsilylstyrene has gone to completion. The solvent is removed from the reaction product by rotary evaporation, and the residue is dissolved in $CH_2Cl_2$ and washed repeatedly with water. The product is then concentrated by rotary evaporation and precipitated by slow addition of the resulting syrup to agitated methanol, followed by filtration and drying under vacuum.

The rate of reaction of the coupling agent with the living ends depends upon the specific reagents and the reaction conditions. For example, in a process involving anionic addition reactions and nucleophilic substitution reactions, the rate of the nucleophilic substitution reaction may be increased relative to the rate of the anionic addition. For the conditions of this example, the chlorodimethylsilyl group of the coupling agent reacts with a living end of a branch to form a branch with a styryl group at its terminus. The addition reaction involving the vinyl functionality of the styryl group and a living end of another branch occurs next.

Example 3

Synthesis of Vinyl Terminated Dendritic Polystyrene

Neat vinyl benzylchloride is added to polystyrene segments and THF formed as described in Example 1 at a slow rate of addition (extending over a time of from 3 to 9 hours) by means of a syringe pump. 3.48 mmoles of chloromethylstyrene are added, and the reaction mixture loses its red color, indicating that the reaction of polystyryllithium and chlorodimethylstyrene has gone to completion.

The length of the polystyrene segment is determined by ratio of styrene monomer to initiator and is calculated as grams of styrene divided by moles of initiator. For example, if the length equals 2000 g/mole, the quantities of styrene and sec-butyl lithium are 1.818 g and 0.909 mmole, respectively.

Example 4

Alcohol Functionalized Dendritic Polystyrene

The process described in Example 2 is repeated. Before the dendritic reaction reaches completion (that is, before the stoichiometric amount of coupling agent is added), dry ethylene oxide is bubbled through the reaction mixture until the solution becomes colorless. The alcoholate chain end is terminated with degassed acetic acid and workup is as described for Example 2.

Example 5

Preparation of Dendritic Polystyrene with Polystyrene Interior Branches

Polystyrene precursor segments having molecular weights of about 500 are prepared as in Example 1. Vinyl benzylchloride is mixed with styrene in a ratio of 1 mole to 5 moles and added to the precursor segments at a slow rate of addition (extending over a time of from 3 to 9 hours) by means of a syringe pump. After complete addition, observed by disappearance of the red color due to polystyryllithium, solvent is removed by rotary evaporation, and the residue is dissolved in $CH_2Cl_2$ and washed repeatedly with water. The product is then concentrated by rotary evaporation and precipitated by slow addition of the resulting syrup to agitated methanol, followed by filtration and drying under vacuum.

Example 6

Preparation of Dendritic Polystyrene-block-linear Polystyrene Copolymers

Dendritic polystyrene is synthesized as described in Example 5. Before the stoichiometric amount of coupling agent is added, styrene monomer (5 ml) is added to the remaining reaction mixture to polymerize a linear chain from the focal point of the dendritic structure. After one hour, chains are terminated with degassed methanol and workup is as described for Example 5.

Samples are taken from the reaction mixture after synthesis of the precursor chain, after formation of the dendritic structure, and after formation of the linear polystyrene block. The samples are analyzed with gel permeation chromatography. Virtually all of the dendritic polymer is attached to a linear polystyrene block. However, a small amount of the initial chain remains with the dendritic material, presumably due to termination by water introduced during sampling.

Example 7

Preparation of Dendritic Polystyrene-block-linear Polyisoprene Copolymers

Dendritic polystyrene is synthesized as described in Example 5. Before the stoichiometric amount of coupling agent is added, isoprene monomer (5 ml) is added to the remaining reaction mixture to polymerize a linear chain from the dendritic structure. After one hour, chains are terminated with degassed methanol and workup is as described for Example 5.

Figure 7:
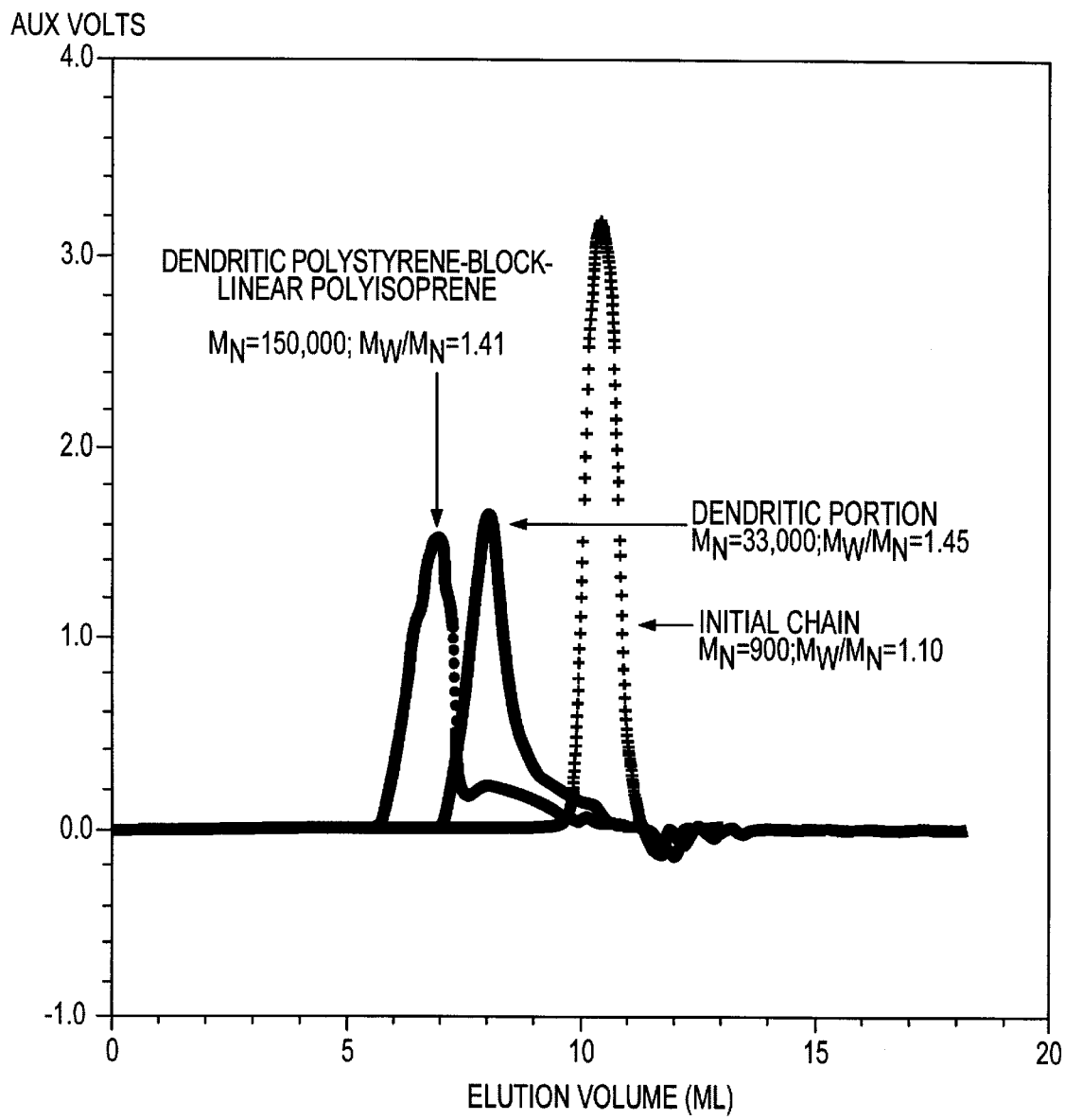
FIG. 7 is a gel permeation chromatogram for polystyryl precursor segments and two materials including a dendritic structure of the present invention.

Samples are taken from the reaction mixture prior to adding the coupling agent, prior to adding the isoprene monomer, and after attaching the linear polyisoprene block. All three samples are analyzed by GPC-MALLS. The results are shown in FIG. 7 and tabulated in Table II for Sample No. 126. For the dendritic polystyrene-block-linear polyisoprene, almost the entire peak shifts to a much higher molecular weight with the addition of the isoprene. Only a small amount of residual dendritic polymer, terminated by adventitious water introduced during sampling, remains in the sample, indicated by the small shoulder at about 8 mL elution volume.

Example 8

Characterization of Dendritic Polystyrenes

A variety of dendritic polystyrenes are synthesized as described in Examples 1–6, using different quantities of styrene monomer to form the precursor segments and different coupling agents. The polystyrenes are terminated with vinyl or alcohol groups, and number average molecular weights, weight average molecular weights, and intrinsic viscosities are determined for each product. $M_w$ and $M_n$ are measured by gel permeation chromatography coupled with light scattering detection. The results are summarized in Table I for samples to which only coupling agent is added and to which a combination of coupling agent and a monomer are added. The polydispersities are generally less than about 1.5, and intrinsic viscosities are all quite low, even for polymers with $M_w$ greater than 100,000.

The results are summarized in Table II for dendritic-block-linear copolymers. The polydispersities remain less than about 1.5 for most samples, although the addition of a long linear block to the copolymer causes the intrinsic viscosity to increase significantly.

Molecular weight characterization of the dendritic polystyrenes is accomplished by GPC coupled with MALLS in order to obtain absolute molecular weight data. Due to the expected shape difference relative to linear polystyrene, it is expected that GPC relative to linear standards will not yield correct molecular weight results. The molecular weights of the products combined with the molecular weights of the starting chains allow for the calculation of the average number of generations as demonstrated by the following equations:

$$M_G = 2^G(M_0) + (2^G - 1)(M_B) \tag{1}$$

$$G = \frac{\log(M_G + M_B) - \log(M_0 + M_B)}{\log 2} \tag{2}$$

where G equals the number of generations, $M_G$ equals the molecular weight of the Gth generation, and $M_0$ equals the molecular weight of the starting chains. $M_B$ equals the molecular weight of the residue from the coupling agent, except when polystyrene segments are included in interior branches, in which case $M_B$ equals the average molecular weight between branch points with $M_B$ being calculated as the relative amount of styrene multiplied by the molecular weight of a styrene repeating unit (104 g/mole), neglecting the small molecular weight contribution of the residue from the coupling agent.

TABLE I

| Sample No. | Coupling Agent, Monomer for Interior Branches (ratio of coupling agent to monomer for interior branches) | $M_n$ of Polysytrene Precursor Segments | $M_w$ (g/mole) | $M_n$ (g/mole) | $M_w/M_n$ Dendritic Polystyrene | Average No. Generations | $[\eta]$ 30° C. THF (dl/g) |
|---|---|---|---|---|---|---|---|
| 74 | Vinyl benzylchloride, none | 1150 | 9,100 | 7,000 | 1.30 | 2.5 | 0.04 |
| 102 | vinyl benzylchloride, none | 1150 | 8,880 | 7,100 | 1.25 | 2.5 | 0.04 |
| 103 | vinyl benzylchloride, none | 1150 | 9,540 | 7,540 | 1.25 | 2.6 | 0.04 |
| 94 | 4-(chlorodimethylsilyl)styrene, none | 1060 | 14,300 | 12,000 | 1.19 | 3.4 | 0.06 |
| 95 | 4-(chlorodimethylsilyl)styrene, none | 1150 | 13,000 | 11,400 | 1.15 | 3.2 | 0.06 |
| 78 | 4-(chlorodimethylsilyl)styrene, none | 1150 | 14,100 | 12,000 | 1.17 | 3.3 | 0.05 |
| 110 | 4-(chlorodimethylsilyl)styrene, none | 1022 | 13,000 | 11,300 | 1.15 | 3.4 | 0.06 |
| 138 | vinylbenzylchloride, styrene (1:5) | 990 | 29,000 | 21,500 | 1.35 | 3.8 | 0.07 |
| 139 | vinylbenzylchloride, styrene (1:5) | 1270 | 34,700 | 28,200 | 1.23 | 4.0 | 0.07 |
| 72 | Vinyl benzylchloride, styrene (1:10) | 1150 | 43,100 | 32,100 | 1.34 | 3.9 | 0.12 |
| 100 | vinylbenzylchloride, styrene (1:10) | 1150 | 58,600 | 41,220 | 1.42 | 4.2 | 0.10 |
| 128 | vinyl benzylchloride, styrene (1:10) | 1040 | 60,200 | 47,200 | 1.28 | 4.5 | 0.09 |
| 124 | vinylbenzylchloride, styrene (1:10) | 1140 | 59,100 | 39,200 | 1.51 | 4.2 | 0.09 |
| 158 | vinylbenzylchloride, styrene (1:10) | 1190 | 41,400 | 28,700 | 1.44 | 3.7 | 0.07 |
| 112 | vinyl benzylchloride, styrene (1:10) | 1240 | 62,300 | 40,400 | 1.54 | 4.1 | 0.08 |
| 130 | vinyl benzylchloride, styrene (1:10) | 1344 | 56,560 | 34,800 | 1.63 | 3.9 | 0.09 |
| 146 | vinyl benzylchloride, styrene (1:10) | 1620 | 85,900 | 60,200 | 1.43 | 4.4 | 0.10 |
| 92 | 4-(chlorodimethylsilyl)styrene, styrene (1:10) | 1100 | 89,600 | 67,900 | 1.32 | 5.0 | 0.10 |
| 80 | 4-(chlorodimethylsilyl)styrene, styrene (1:10) | 1150 | 91,000 | 67,700 | 1.34 | 5.0 | 0.10 |
| 118 | 4-(chlorodimethylsilyl)styrene, styrene (1:10) | 950 | 106,400 | 87,30 | 1.22 | 5.4 | 0.11 |
| 140 | vinylbenzylchloride, styrene (1:15) | 1150 | 86,700 | 58,600 | 1.48 | 4.4 | 0.11 |
| 164 | 4-(chlorodimethylsilyl)styrene, styrene (1:15) | 1480 | 114,300 | 100,600 | 1.14 | 5.1 | 0.13 |
| 144 | vinyl benzylchloride, styrene (1:20) | 1070 | 154,700 | 93,500 | 1.66 | 4.9 | 0.15 |
| 166 | 4-(chlorodimethylsilyl)styrene, styrene (1:20) | 1150 | 163,200 | 136,900 | 1.19 | 5.3 | 0.15 |

TABLE II

| Sample No. | Linear Copolymer | $M_n$ of Precursor Segments | Dendritic Structure | | | Linear Copolymer | | | $[\eta]$ 30° C. THF (dl/g) |
|---|---|---|---|---|---|---|---|---|---|
| | | | $M_w$ g/mole | $M_n$ g/mole | $M_w/M_n$ | $M_w$ g/mole | $M_n$ g/mole | $M_w/M_n$ | |
| 126 | isoprene | 900 | 47,900 | 33,000 | 1.45 | 210,000 | 148,000 | 1.41 | 0.58 |
| 123 | isoprene | 1100 | 7,700 | 5,200 | 1.47 | 152,000 | 13,700 | 0.11 | 0.10 |
| 125 | styrene | 980 | 11,400 | 8,000 | 1.43 | 36,600 | 33,000 | 0.11 | 0.15 |
| 76 | styrene | 600 | 20,600 | 14,600 | 1.42 | 101,900 | 98,860 | 1.03 | 0.29 |
| 134 | styrene | 1240 | 37,810 | 22,620 | 1.67 | 150,800 | 115,100 | 1.31 | 0.35 |
| 132 | Hexamethylcyclotrisiloxane | 1400 | 16,670 | 11,940 | 1.39 | 22,030 | 16,140 | 1.36 | 0.08 |
| 142 | Epichlorohydrin | 1313 | 37,140 | 26,940 | 1.38 | 37,800 | 27,860 | 1.36 | 0.08 |

Example 9

Polydispersity as a Function of Reaction Time

A reaction is conducted using 4-(chlorodimethylsilyl) styrene as a coupling agent and styrene monomer added slowly over the course of 5 hours in a molar ratio of 1:10. Samples are removed after varying lengths of time during the addition, and the results are shown in Table III. The polydispersity index remains relatively low and uniform for the first four samples and increases appreciably for the reaction time of 5 hours. The high polydispersity index of the 5-hour sample is attributed to the introduction of small quantities of water during the previous sampling, resulting in premature termination of some branches.

TABLE III

| | GPC Molecular Weight Analysis | | |
|---|---|---|---|
| Reaction Time, hr. | $M_w$ | $M_n$ | $M_w/M_n$ |
| 1 | 5500 | 4200 | 1.32 |
| 2 | 7500 | 5100 | 1.44 |
| 3 | 9300 | 6900 | 1.33 |
| 3.7 | 10700 | 7900 | 1.35 |
| 5 | 46200 | 19900 | 2.31 |

Example 10

Dendritic Polystyrene Grafted Polystyrene

Figure 8:
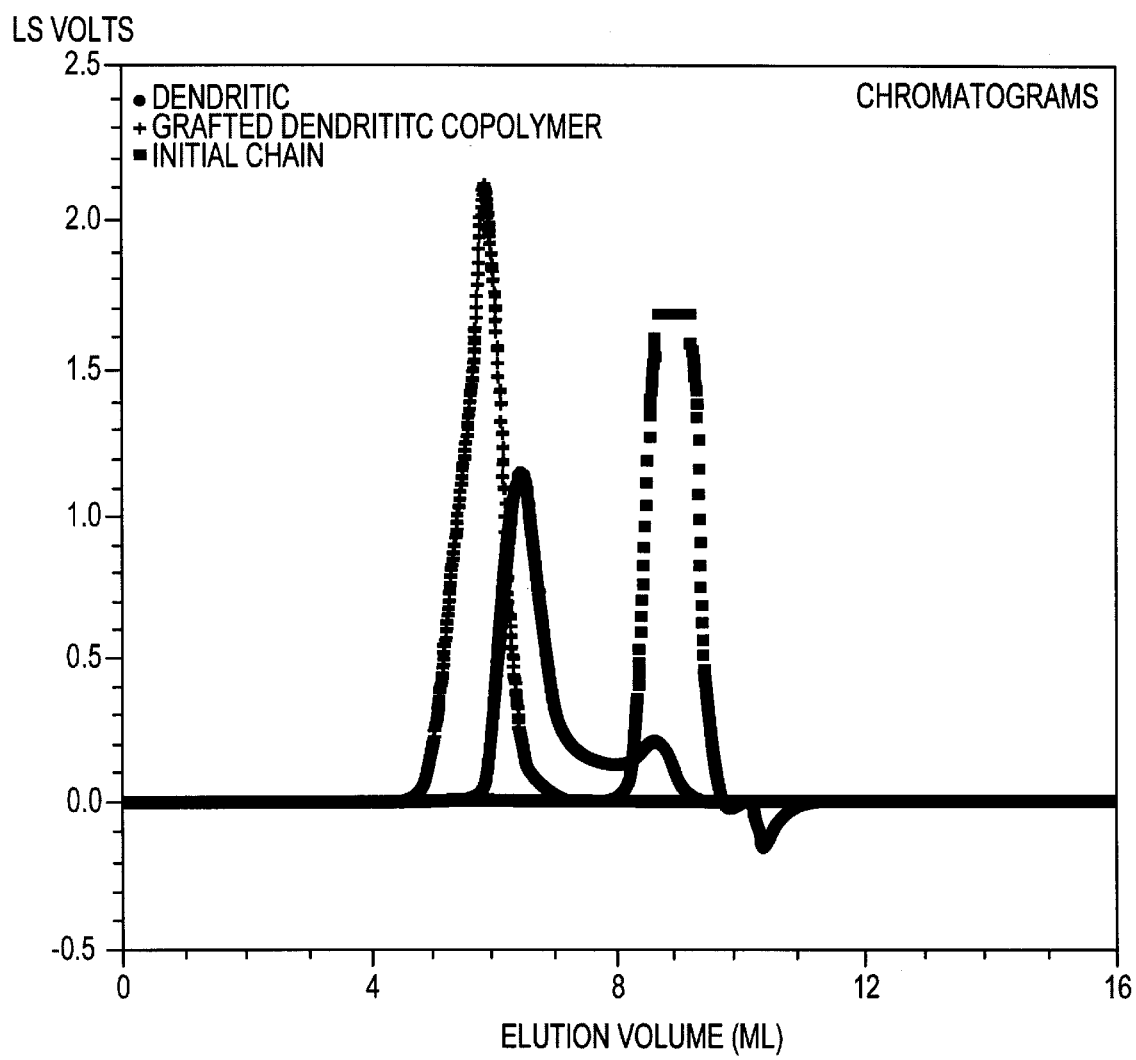
FIG. 8 is a gel permeation chromatogram for two materials including the dendritic structure of the present invention.

Vinyl terminated dendritic polystyrene is synthesized first forming polystyrene precursor segments having molecular weights of about 1000 g/mole by the procedure described in Example 1. A mixture of styrene (7.3 ml) and chlorodimethylsilylstyrene (1.0 ml) is then introduced at a rate of 1 ml/hr. This is approximately a 10:1 molar mixture of styrene: chlorodimethylsilylstyrene. After approximately four and one half hours, the color of the polystyryl lithium disappears and the addition is stopped. 5.0 ml of styrene is then added, followed by 2 to 3 drops of sec-butyllithium, resulting in the appearance of color representative of the polystyryllithium. After one hour, the reaction is terminated with a few drops of degassed methanol and workup is as described for Example 2. Characterization of the dendritic portion shows $M_w$=79,770; $M_n$=71,820, and $M_w/M_n$=1.11. Characterization of the grafted copolymer shows $M_w$=225,100; $M_n$=195,900; and $M_w/M_n$=1.15. FIG. 8 shows the gel permeation chromatography results.

The present invention is described herein by the specification, including the examples and the claims, and the drawings with reference to various embodiments of the invention, which description is intended to set forth an enabling disclosure of the present invention, including the best mode for practicing the invention. While specific embodiments of the present invention are described herein in detail, including the examples set forth herein, it is apparent that modifications and adaptations to those embodiments will occur to those skilled in the art. It is to be expressly understood that such modifications and adaptations are within the scope of the invention. Furthermore, it should be recognized that features described with one embodiment herein may be combined, with suitable accommodation as required, with one or more compatible features described in any other embodiment, and any feature set forth and any claim appended hereto may be combined in any combination with one or more features set forth in any other claim or claims, so long as the combination does not include mutually exclusive or inconsistent features. Moreover, it should be recognized that the present invention is not limited to the specific combinations and subcombinations of features as specifically described in detail, but includes each combination of described features not forming a part of the prior art, even if not specifically described herein in that combination.

What is claimed is:

1. A convergent method for synthesizing dendritic polymeric materials, the method comprising:

providing a living polymerization reaction mixture including polymeric precursor segments each having a living end capable of reacting in a polymerization reaction;

coupling said precursor segments together in a convergent manner involving reaction of a multi-functional coupling agent to form a hyperbranched structure including branch points at reaction residues of said coupling agent, said coupling agent having at least a first group and a second group that are each capable of independently reacting with said living end and each capable of reacting at a different rate with said living end of said polymeric precursor segments to produce first generation branch structures, said coupling in a convergent manner further involving coupling at least first generation branch structures to form second generation branch structures, wherein first generation branch structures react more slowly to produce said second generation branch structures than said rates at which said coupling agent reacts with said polymeric precursor segments to produce said first generation branch structures;

wherein, during said coupling step, reaction of said coupling agent being controlled by the addition of said multi-functional coupling agent to said living polymerization reaction mixture at a rate that is slow enough to leave enough living ends with which the coupling agent can react so as to form said hyperbranched structure and of sufficient quantity overtime to form said hyperbranched structure, wherein said hyperbranched structure is a multi-generational dendritic structure having an average of at least about 2 generations of branching and a polydispersity index of smaller than about 3, and including said precursor segments in exterior branches of said dendritic structure.

2. The method of claim 1, wherein:

during said step of coupling, said coupling agent is added to said reaction mixture over an extended time to substantially promote dendritic branching.

3. The method of claim 2, wherein:

said coupling agent is added continuously to said reaction mixture over said extended time.

4. The method of claim 1, wherein:

during said step of coupling, said coupling agent is added at a sufficiently slow rate to substantially promote coupling reactions to form dendritic branching.

5. The method of claim 1, wherein:

said precursor segments are first polymeric segments and, during said step of coupling, monomer other than said coupling agent is added to said reaction mixture and polymerized to form internal branches including second polymeric segments having a plurality of repeating units from polymerization of said monomer.

6. The method of claim 5, wherein:

said first polymeric segments and said second polymeric segments are of substantially the same composition.

7. The method of claim 5, wherein:

said first polymeric segments and said second polymeric segments are of substantially different compositions.

8. The method of claim 5, wherein:

during said step of coupling, said coupling agent and said monomer are added to said reaction mixture over an extended time.

9. The method of claim 8, wherein:

said coupling agent and said monomer are added simultaneously to said reaction mixture during said extended time.

10. The method of claim 9, wherein:

said coupling agent and said monomer are added to said reaction mixture substantially continuously during said extended time.

11. The method of claim 8, wherein:
said coupling agent and said monomer are added separately during different portions of said extended time.

12. The method of claim 8, wherein:
over said extended time, said monomer and said coupling agent are added to said reaction mixture at a ratio of said monomer to said coupling agent of at least about 5 to 1.

13. The method of claim 8, wherein:
over said extended time, said monomer and said coupling agent are added to said reaction mixture at a ratio of said monomer to said coupling agent of at least about 10 to 1.

14. The method of claim 8, wherein:
over said extended time, said monomer and said coupling agent are added to said reaction mixture at a ratio of said monomer to said coupling agent of at least about 20 to 1.

15. The method of claim 8, wherein:
over said extended time, said monomer and said coupling agent are added to said reaction mixture at a ratio of said monomer to said coupling agent of at least about 50 to 1.

16. The method of claim 5, wherein:
said monomer is ethylenically unsaturated.

17. The method of claim 5, wherein:
said monomer is ethylenically mono-unsaturated.

18. The method of claim 5, wherein:
said monomer is a vinyl monomer.

19. The method of claim 5, wherein:
said monomer is a styrenic monomer.

20. The method of claim 5, wherein:
said first polymeric segments and said second polymeric segments are polystyrenic segments.

21. The method of claim 5, wherein:
said second polymeric segments include an average of at least about 5 of said repeating units.

22. The method of claim 5, wherein:
said extended time is longer than about 10 minutes.

23. The method of claim 1, wherein:
said step of coupling comprises successive generations of coupling reactions, the number of living-type ends in said reaction mixture decreasing with each said successive generation of coupling.

24. The method of claim 1, wherein:
the number of living type ends in said reaction mixture decreasing by at least about ½ between said generations of coupling.

25. The method of claim 1, wherein:
said step of providing said living polymerization reaction mixture comprises polymerizing at least one monomer in a living polymerization to form said precursor segments, said precursor segments including an average of at least about 5 repeating units from polymerization of said monomer.

26. The method of claim 25, wherein:
said step of polymerizing to form said precursor segments is performed substantially in the absence of said coupling agent.

27. The method of claim 25, wherein:
said monomer is an ethylenically unsaturated monomer, and during said step of polymerizing said monomer, said monomer undergoes addition polymerization.

28. The method of claim 27, wherein:
said monomer is a vinyl monomer.

29. The method of claim 28, wherein:
said monomer is a styrenic monomer.

30. The method of claim 29, wherein:
said monomer is unsubstituted styrene or a substituted styrene.

31. The method of claim 25, wherein:
said steps of providing a living polymerization reaction mixture and of coupling said precursor segments together in a convergent manner are performed in a one-pot process, substantially without isolation or purification of any intermediate product.

32. The method of claim 1, wherein:
during said step of coupling, said coupling agent reacts to form, at reaction residues of said coupling agent, branch points of said dendritic structure.

33. The method of claim 32, wherein:
said coupling agent comprises an ethylenically unsaturated first group which reacts in an addition reaction, during said step of coupling, to couple at least two branches at said branch points; and
said coupling agent further comprises at least a second group which reacts in a manner different than said first group to couple at least one additional branch at said branch points, such that at said branch points, at least three branches of said dendritic structure are coupled.

34. The method of claim 33, wherein:
said second group reacts by nucleophilic substitution.

35. The method of claim 33, wherein:
said coupling agent is a substituted styrene, the vinyl group of said substituted styrene being said first group and a substituent on the benzene ring of the substituted styrene being the second group.

36. The method of claim 35, wherein:
said second group comprises a halogen.

37. The method of claim 1, wherein:
said coupling agent is vinyl benzylchloride.

38. The method of claim 1, wherein:
said living ends are selected from the group consisting of living anionic ends, living cationic ends and living free radical ends.

39. The method of claim 1, wherein:
said dendritic structure has at least about 3 generations of branching.

40. The method of claim 1, wherein:
said dendritic structure has at least about 4 generations of branching.

41. The method of claim 1, wherein:
said dendritic structure has at least about 5 generations of branching.

42. The method of claim 1, wherein:
said dendritic structure has a weight average molecular weight of larger than about 10,000.

43. The method of claim 1, wherein:
said dendritic structure has a weight average molecular weight of larger than about 50,000.

44. The method of claim 1, wherein:
said dendritic structure has a weight average molecular weight of larger than about 100,000.

45. The method of claim 1, wherein:
the method further comprises terminating the step of coupling and recovering said dendritic structure from said reaction mixture.

46. A dendritic structure made according to the method of claim 1.

47. A dendritic structure made according to the method of claim 5.

48. A dendritic structure made according to the method of claim 20.

* * * * *

UNITED STATES PATENT AND TRADEMARK OFFICE
CERTIFICATE OF CORRECTION

PATENT NO. : 6,255,424 B1
DATED : July 3, 2001
INVENTOR(S) : Daniel M. Knauss

It is certified that error appears in the above-identified patent and that said Letters Patent is hereby corrected as shown below:

Column 15,
Line 23, delete "nitrites" and insert -- nitriles --;

Column 16,
Line 15, delete "norbornene" and insert -- norbornenes --;

Column 20,
Line 35, delete "block" and insert -- *block* --;

Column 21,
TABLE II, for Sample No. 76, delete "98.860" and insert -- 98,800 --;

Column 23,
Line 26, delete "sec" and insert -- *sec* --; and

Column 24,
Line 24, delete "overtime" and insert -- over time --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*